United States Patent

[11] 3,577,797

[72] Inventor  Eugenio Todeschini
             Reggio Emilia, Italy
[21] Appl. No. 830,737
[22] Filed     June 5, 1969
[45] Patented  May 4, 1971
[73] Assignee  Massey-Ferguson Services N.V.
             Curacao, Netherlands
[32] Priority  June 10, 1968
[33]           Italy
[31]           17559A/68

[54] BRAKING SYSTEM FOR A VEHICLE
     1 Claim, 2 Drawing Figs.
[52] U.S. Cl. .................................................. 74/479,
                                                              74/512
[51] Int. Cl. ........................................... G05g 11/00
[50] Field of Search ............................................ 74/479,
                                480, 512, 522; 188/106, 79.5 (K)

[56]                    References Cited
                    UNITED STATES PATENTS
1,877,385  9/1932  Casaletto ...................... 74/512X OTHER REFERENCES
Paul et al., German application 1,012,835, printed July 25, 1957. Class 188/106.

Primary Examiner—Milton Kaufman
Attorney—Gerhardt, Greenlee & Farris

ABSTRACT: A braking system for a vehicle includes primary powered and secondary mechanical brake actuation means for alternative operation of a brake. The secondary mechanical brake actuation means includes connection means adapted to be adjusted automatically in response to repeated operation of the primary powered brake actuation means. In a preferred embodiment the connection means includes a ratchet and a cooperating pawl for stepwise adjustment of the connection means and a lost motion connection to accommodate free movement within the connection means during operation of the primary powered brake actuation means. When a predetermined amount of brake wear has taken place operation of the primary powered brake actuation means is effective to cause movement between the pawl and the ratchet and adjust the connection means.

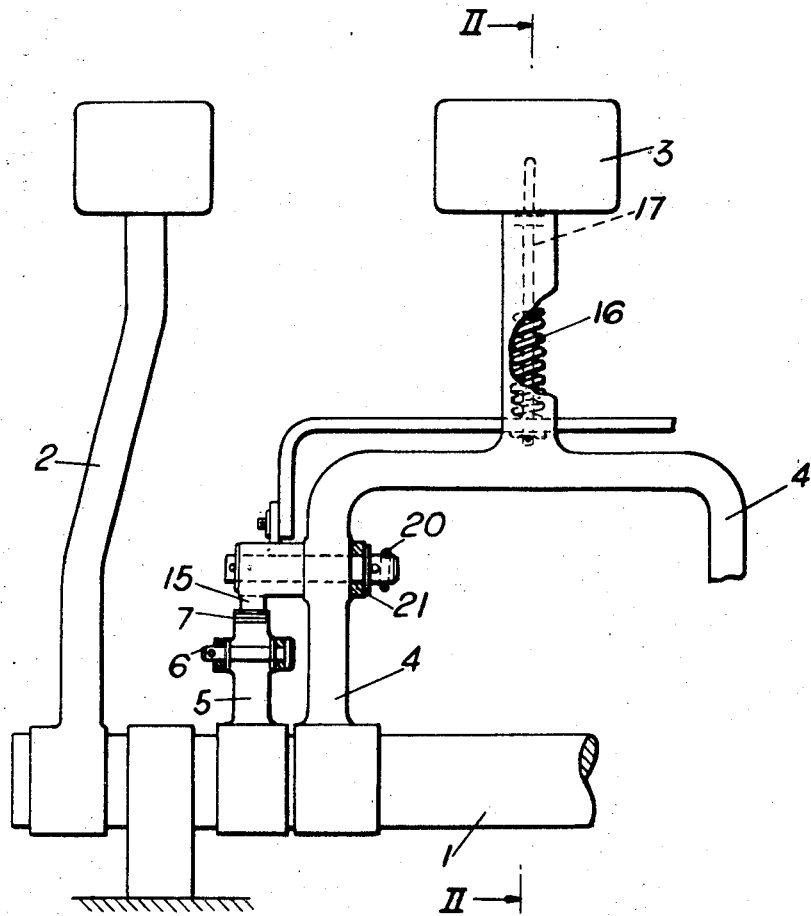

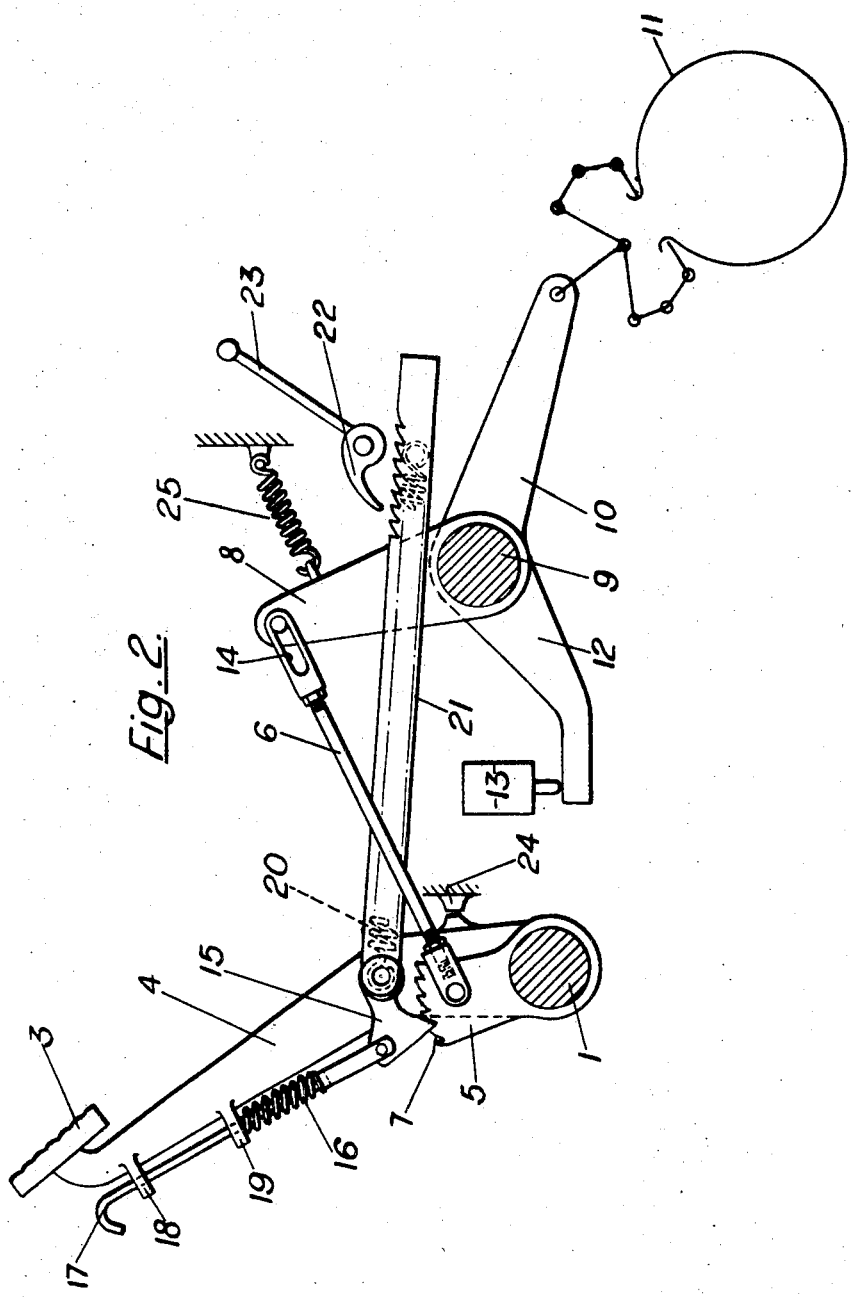

BRAKING SYSTEM FOR A VEHICLE

This invention relates to a braking system for a vehicle, including primary powered and secondary mechanical brake actuation means for alternative operation of a brake, the secondary mechanical brake actuation means including connection means adjustable to compensate for brake wear.

It is known to provide a braking system in a vehicle including primary powered, for example hydraulically operated brake actuation means and secondary mechanical brake actuation means for use if the primary means fails. It is also known to provide within mechanical brake actuation means connection means adjustable to compensate for brake wear. In track laying vehicles such as crawler tractors the brakes are used for steering as well as for stopping and the brakes often wear nonuniformly. Furthermore, since for example crawler tractors are heavy vehicles a mechanical brake fitted therein is required to have a large mechanical advantage and therefore large travel at the brake pedal. Due to the infrequency of operation of the mechanical brake pedal, it could happen that any need for adjustment within the mechanical brake actuation means is not apparent to the operator with the consequent risk of an accident when such means is required to be operated.

The invention seeks to overcome this problem and provides a braking system for a vehicle, including primary powered and secondary mechanical brake actuation means for alternative operation of a brake, the secondary mechanical brake actuation means including connection means adjustable to compensate for brake wear automatically in response to repeated operation of the primary powered brake actuation means.

This invention will be described hereinafter by way of example with reference to the accompanying drawings, in which:

FIG. 1 is a partial view of the pedals and associated parts of an embodiment of a braking system according to the invention for a crawler tractor; and FIG. 2 is a view on section line II—II of FIG. 1 showing additional parts of the braking system and a brake represented diagrammatically.

In the drawings, a fixed shaft 1 forms a pivot for the pedals of which two side pedals 2, only one of which is shown, are provided to control the brakes associated with respective tracks of a crawler tractor, and a central pedal 3 is provided to control the brakes associated with both tracks. The central pedal 3 includes a bifurcated lever 4 pivoted to the shaft 1 and also pivoted at one end to the shaft alongside each bifurcation of the lever 4 is a shorter lever 5. Referring specifically to FIG. 2, the lever 5 is articulated intermediate its ends to a tie rod 6 and its other end is provided with a ratchet 7. The tie rod 6 is also articulated to one end of lever 8 fixed relatively to a rotatable main brake shaft 9. A further lever 10 is also fixed to the shaft 9 and is operable on a brake 11 shown diagrammatically in FIG. 2. A still further lever 12 is also fixed to the shaft 9 and is operable by means of a hydraulic actuator 13 controlled by the pedal 2, these parts together with the lever 10, constituting primary powered brake actuation means.

The tie rod 6 is slotted at 14 to provide a lost motion connection between it and the lever 8 and a pawl 15 cooperates with the ratchet 7, these parts together with the lever 5, constituting connection means in secondary mechanical brake actuation means also including the pedal 3 and the lever 10. The pawl 15 is pivoted to the lever 4 and is urged into contact with the ratchet 7 by a compression spring 16 encircling a rod 17 pivoted at one end to the pawl and at the end being hooked for manual disengagement of the pawl from the ratchet. The rod 17 is slidable alongside the lever 4 in guide lugs 18 and 19 extending from the lever, the lug 19 forming an abutment for the spring 16 which is strong enough to maintain the levers 4 and 5 together during movement of the former towards the brakes-off position.

A tension spring 20 urges the lever 4 towards the brakes-off position and alongside the spring is a ratchet rod 21 pivoted at one end at the pivot point between the lever 4 and the pawl 15. A pawl 22 is operable to engage the ratchet rod 21 and maintain the lever 4 in its brakes-on position when desired and a handle 25 is provided to disengage the pawl 22. A stop 24 is provided for the lever 4 to restrict its movement in the brakes-off direction, and a tension spring 25 is provided to urge the lever 8 in a brakes-off direction.

Operation of the secondary mechanical brake actuation means is by depression of the pedal 3 and the pivoting forward of the lever 4 about the shaft 1. Since the lever 4 is connected to the lever 5 through the pawl 15 and the ratchet 7, the lever 5 also pivots forward about the shaft 1. This exerts tension on the tie rod 6 to pivot the levers 8 and 10 and thus apply the brake 11. Operation of the primary powered brake actuation means is by depression of the pedal 2 which causes actuation of the levers 12 and 10 by means of the hydraulic actuator 13. Movement of the levers 12 and 10 is accompanied by movement of the lever 8. The slot 14 permits a predetermined amount of free movement of the lever but as the brake 11 wears, a time will come when the angular movement of the lever 12 by the actuator 13 required to apply the brake will cause the lever 8 to travel to the end of the slot 14 and push the tie rod 6 to a small extent. Further operation of the primary powered brake actuation means will increase the amount by which the tie rod 6 is pushed as further wear occurs at the brake until such time as the amount the tie rod is pushed is sufficient to push one tooth of the ratchet 7 under the pawl 15. Thus the connection means in the secondary mechanical brake actuation means is automatically adjusted to compensate for the wear which has occurred at the brake 11.

For large readjustment within, or replacement of the brake 11 the rod 17 is pulled to disengage the pawl 15 from the ratchet and thereafter released to permit the pawl to engage between appropriate teeth of the ratchet.

It will be appreciated that the parts described with reference to, and illustrated in, FIG. 2 are associated with one bifurcation of the lever 4 for operation of one track of the crawler tractor and that similar parts are in fact associated with the other bifurcation for operation of the brake of the other track.

I claim:

1. A braking system for a vehicle, including primary powered and secondary mechanical brake actuation means for alternative operation of a brake, the secondary mechanical brake actuation means including connection means adjustable to compensate for brake wear automatically in response to repeated operation of the primary powered brake actuation means, the connection means including a ratchet and a cooperating pawl for stepwise adjustment of the connection means and a lost motion connection provided in a tie rod connected to a lever including the ratchet which is pivotable about the same axis as and is adjustable with respect to a pedal of the secondary mechanical brake actuation means, which pedal carries the pawl, the lost motion connection accommodating free movement within the connection means during operation of the primary powered brake actuation means until such time as a predetermined amount of brake wear has taken place, whereupon operation of the primary powered brake actuation means is effective to cause movement between the pawl and the ratchet and adjust the connection means.